(12) United States Patent
Kottapalli et al.

(10) Patent No.: US 11,032,295 B2
(45) Date of Patent: Jun. 8, 2021

(54) SECURITY MONITORING INFORMATION-BASED PROVISIONING OF DIGITAL CERTIFICATES IN SOFTWARE DEFINED DATA CENTERS

(71) Applicant: VMWARE, INC., Palo Alto, CA (US)

(72) Inventors: Ravi Kumar Reddy Kottapalli, Bangalore (IN); Avinash Mudivedu, Palo Alto, CA (US)

(73) Assignee: VMWARE, INC., Palo Alto, CA (US)

(*) Notice: Subject to any disclaimer, the term of this patent is extended or adjusted under 35 U.S.C. 154(b) by 295 days.

(21) Appl. No.: 16/357,355

(22) Filed: Mar. 19, 2019

(65) Prior Publication Data

US 2020/0228547 A1 Jul. 16, 2020

(30) Foreign Application Priority Data

Jan. 16, 2019 (IN) .............................. 201941001904

(51) Int. Cl.
*H04L 29/06* (2006.01)
*H04W 12/67* (2021.01)
*H04L 12/26* (2006.01)

(52) U.S. Cl.
CPC ...... *H04L 63/1408* (2013.01); *H04L 29/0685* (2013.01); *H04L 63/0823* (2013.01); *H04L 63/1433* (2013.01); *H04L 63/1441* (2013.01); *H04L 63/1475* (2013.01); *H04W 12/67* (2021.01); *H04L 43/0894* (2013.01)

(58) Field of Classification Search
CPC ............. H04L 63/1408; H04L 29/0685; H04L 63/1441; H04L 63/1433; H04L 63/1475; H04L 63/0823; H04L 63/105; H04W 12/67
See application file for complete search history.

(56) References Cited

U.S. PATENT DOCUMENTS 9,215,231 B1 * 12/2015 Bowen ................ H04L 63/1416
2018/0262504 A1 * 9/2018 Frederick .................. H04L 9/30

* cited by examiner

*Primary Examiner* — Huan V Doan

(57) ABSTRACT

Techniques for provisioning of digital certificates in software defined data centers (SDDCs) based on security monitoring information are disclosed. In one example, a set of digital certificates may be assigned to a group of computing resources of an SDDC. Each digital certificate may include a different security level. The group of computing resources may include applications that use a first digital certificate with a first security level for data communication. Further, security monitoring information associated with the group of computing resources may be received. Furthermore, a second security level to be used for the group of computing resources may be determined based on the security monitoring information. The group of computing resources may be managed by communicating the second security level to an agent associated with the group of computing resources. The agent may then implement a second digital certificate with the second security level for the applications.

21 Claims, 4 Drawing Sheets

SECURITY MONITORING INFORMATION-BASED PROVISIONING OF DIGITAL CERTIFICATES IN SOFTWARE DEFINED DATA CENTERS

RELATED APPLICATIONS

Benefit is claimed under 35 U.S.C. 119(a)-(d) to Foreign Application Serial No. 201941001904 filed in India entitled "SECURITY MONITORING INFORMATION-BASED PROVISIONING OF DIGITAL CERTIFICATES IN SOFTWARE DEFINED DATA CENTERS", on Jan. 16, 2019, by VMWARE, Inc., which is herein incorporated in its entirety by reference for all purposes.

TECHNICAL FIELD

The present disclosure relates to computing environments, and more particularly to methods, techniques, and systems for provisioning of digital certificates in software defined data centers (SDDCs) based on security monitoring information.

BACKGROUND

In software defined data centers (SDDCs), networking, storage, processing, and security may be virtualized and delivered as a service (e.g., referred to as "Infrastructure as a Service"). In such instances, the deployment, provisioning, configuration, and operation of the entire network infrastructure may be abstracted from hardware and implemented using software. Further, the SDDC may include multiple groups of computing resources and each group of computing resources may execute applications. For example, the applications may include management and/or monitoring components corresponding to network virtualization, server virtualization, storage virtualization, and the like. Further, the applications may be exposed to a risk of various attacks as the applications communicate data via a network (e.g., Internet). To avoid such attacks, security techniques using digital certificates may be implemented in the applications for data communications.

Figure 1:
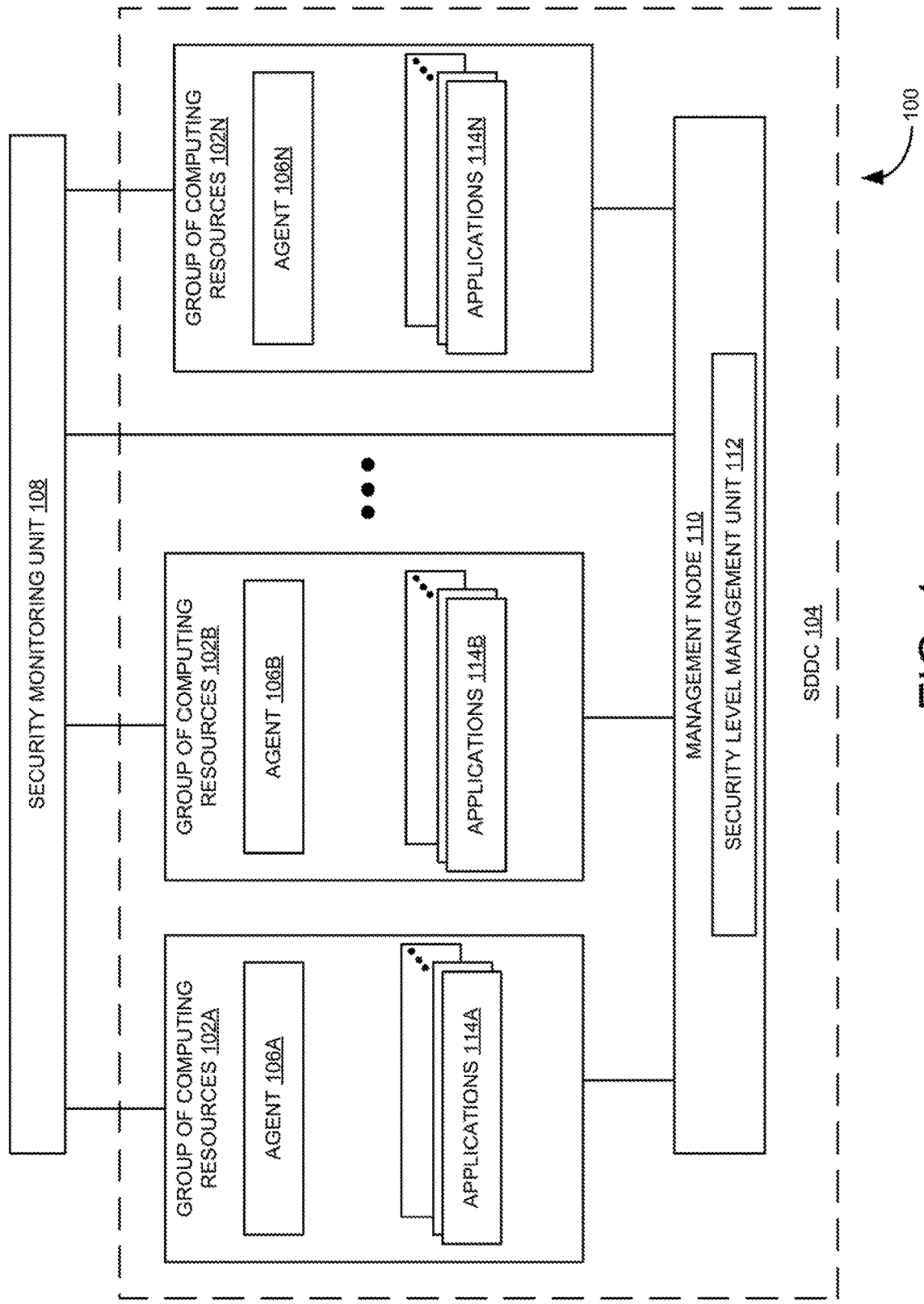
FIG. 1 is a block diagram of an example system, including a security level management unit to determine a security level to be used for a group of computing resources in a software defined data center (SDDC)

The drawings described herein are for illustration purposes only and are not intended to limit the scope of the present subject matter in any way.

DETAILED DESCRIPTION

Examples described herein may provide an enhanced computer-based and network-based method, technique, and system for provisioning of digital certificates in software defined data centers (SDDCs) based on security monitoring information. An SDDC may refer to a data center where all infrastructure may be virtualized and delivered as a service. Further, the SDDC may include multiple groups of computing resources and each group of computing resources may be a policy-based resource container with specific availability and performance attributes that combines compute (e.g., vSphere of VMware®), storage (vSAN of VMware®), and networking (e.g., NSX of VMware®) into a single consumable entity via different applications. For example, each group of computing resources may correspond to one workload domain or cluster of the SDDC. In some examples, data associated with the applications may be secured using digital certificates to avoid a risk of various attacks as the applications communicate data via networks (e.g., Internet).

A digital certificate may allow the applications to exchange data securely over the Internet using a public key infrastructure (PKI). Digital certificate may also be referred as a public key certificate or identity certificate. The digital certificate may include information about the public key, information about the identity of its owner (e.g., a subject), and the digital signature of an entity that has verified the certificate's contents (e.g., an issuer). Further, the digital signature may be composed of different algorithms such as a hashing algorithm and a signing algorithm. The hashing algorithm may be a cryptographic hash function. Also, the hashing algorithm may be a mathematical algorithm that maps data of arbitrary size to a hash of a fixed size. For example, the hash may be a value computed from a base input number using a hashing function and the hash value may be a summary of the original data. An example for the signing algorithm may be a Rivest-Shamir-Adleman (RSA) algorithm. The RSA may be one of the public-key cryptosystems used for secure data transmission. In such a cryptosystem, an encryption key may be public and different from a decryption key which may be kept secret (i.e., private).

In some examples, strength of the digital certificate may be directly related to a key length associated with the signing algorithm (e.g., the RSA algorithm). For example, the larger the key length, the data encrypted using the digital certificate may be more secured. However, with an increased key length, the process of encryption and/or decryption of the key may be significantly slower and may consume significantly more computational power. On the other hand, with a reduced key length, the digital certificate may become weaker and the data may be significantly less secured.

Examples described herein may dynamically adjust or provision a security level of the digital certificate in an SDDC based on a severity of attacks corresponding to a group of computing resources of the SDDC. Examples described herein may assign a set of digital certificates to the group of computing resources and each digital certificate in the set of digital certificates may include a different security level. In this example, the group of computing resources may include applications that initially use a first digital certificate with a first security level from the set of digital certificates for data communication. Further, examples described herein may receive security monitoring information associated with the group of computing resources, determine a second security level to be used for the group of computing resources based on the received security monitoring information, and managing the group of computing resources by communicating the second security level to an agent associated with the group of computing resources. The agent may then implement a second digital certificate with the second security level for the applications running in the group of computing resources. For example, the second security level may be greater than the first security level. Thus, examples described herein may dynamically adjust the security levels of the digital certificate based on the security monitoring information to enhance the encryption and decryption process time and/or to optimize the computational power to encrypt and/or decrypt the keys.

System Overview and Examples of Operation

FIG. 1 is a block diagram of an example system 100, including a security level management unit 112 to determine a security level to be used for a group of computing resources (e.g., 102A) in a software defined data center (SDDC) 104. System 100 may include SDDC 104, which may create a private cloud used to meet data processing, network, and storage needs of the business/organization that operates the private cloud. SDDC 104 may also be used to implement portions of a public cloud and in some instances can be used to create a hybrid cloud that includes a private cloud that accesses or utilizes portions of the public cloud.

As shown in FIG. 1, SDDC 104 may include multiple groups of computing resources 102A-102N. In one example, each group of computing resources (e.g., 102A) may implement a workload domain (e.g., a cluster). Group of computing resources/workload domain 102A may be a policy-based resource container with specific availability and performance attributes that combines compute (e.g., vSphere of VMware®), storage (e.g., vSAN of VMware®), and networking (e.g., NSX of VMware®) into a single consumable entity and executes corresponding applications 114A-114N. Example applications 114A-114N may include monitoring and/or management components such as Virtual Resource Manager (VRM), Physical Resource Manager (PRM), Logical Resource Manager (LRM), Lifecycle Manager (LCM), Virtual Imaging Appliance (VIA), Open Hardware Management System (OHMS), Infrastructure Virtual Machine (ISVM), or the like. Example workload domain may include a Virtual Infrastructure (VI) or Virtual Desktop Infrastructure (VDI). Further, the workload domain can be created on-demand. In one example, each workload domain may be created according to a user specified size, performance, and availability. For example, a cloud administrator can create one workload domain for test workloads that have balanced performance and low availability requirements, while creating a separate workload domain for production workloads requiring high availability and high performance. In one example, the workload domain may be deployed in a virtual server rack. The virtual server rack may include group of computing resources 102A located across a plurality of physical racks. In another example, the workload domain may be deployed in a single physical rack.

Further, SDDC 104 may include a management node 110 communicatively coupled to plurality of groups of computing resources 102A-102N. In one example, management node 110 may be a management domain, which may be a special-purpose workload domain dedicated to infrastructure and management tasks. Further, management node 110 may manage groups of computing resources 102A-102N and performs lifecycle management to ensure that the applications/components 114A-114N in each group of computing resources 102A-102N remain up-to-to date.

In one example, management node 110 may include security level management unit 112. During operation, security level management unit 112 may assign a set of digital certificates to group of computing resources 102A. In one example, each digital certificate in the set of digital certificates may include a different security level. For example, each group of computing resources 102A-102N may be assigned with a low security level (e.g., 1024 bit key), medium security level (e.g., 2048 bit key), and high security level (e.g., 4096 bit key) of the digital certificates.

As shown in FIG. 1, an agent (e.g., 106A-106N) may run in each group of physical resources 102A-102N to implement one of the low security levels, the medium security level, and the high security level of the digital certificates for data communication. In one example, each agent (e.g., 106A-106N) may refer to an entity, which may be a part of a digital certificate manager associated with corresponding groups of computing resources 102A-102N. For example, an agent 106A may implement a first digital certificate with a first security level (e.g., the low security level) for applications 114A. In this example, applications 114A may use the first digital certificate with the first security level for data communication therebetween and/or with other applications 114B-114N running in SDDC 104. Further, system 100 may include a security monitoring unit 108 communicatively coupled to groups of computing resources 102A-102N to monitor network traffic associated with groups of computing resources 102A-102N. In some examples, security monitoring unit 108 can be implemented as part of management node 110. In other examples, security monitoring unit 108 can be implemented as part of SDDC 104 or external to SDDC 104, and communicatively coupled to management node 110.

During operation, security monitoring unit 108 may determine a number of threats and a severity of each of the threats while monitoring the network traffic associated with group of computing resources 102A. Further, security monitoring unit 108 may communicate the security monitoring information including the number of threats and the severity of each of the threats to management node 110. Thus, security monitoring unit 108 may analyze the traffic at each of groups of computing resources 102A-102N and when any threat or intrusion is detected, security monitoring unit 108 may alert management node 110.

Further, security level management unit 112 may receive the security monitoring information from security monitoring unit 108. Furthermore, security level management unit 112 may determine a second security level (e.g., the medium security level or the high security level) to be used for group of computing resources 102A based on the received security monitoring information.

In one example, security level management unit 112 may update mapping information in a threat management table using the security monitoring information. The mapping information may include the number of threats and the severity of the threats mapped with a corresponding security level. The threat management table is described with an example in FIG. 2. Further, security level management unit 112 may determine the second security level using the updated mapping information. Further, security level management unit 112 may manage group of computing resources 102A by communicating the second security level to an agent 106A. In one example, security level management unit 112 may communicate the second security level to agent 106A via a tag associated with the second security level.

Furthermore, agent 106A may implement a second digital certificate with the second security level for corresponding applications 114A. In one example, agent 106A may implement the second digital certificate with the second security level for corresponding applications 114A in group of physical resources 102A based on the tag (i.e., upon receiving the tag).

In some examples, the functionalities described herein, in relation to instructions to implement functions of agents 106A-106N, security monitoring system 108, security level management unit 112, and any additional instructions described herein in relation to the storage medium, may be implemented as engines or modules including any combination of hardware and programming to implement the functionalities of the modules or engines described herein. The functions of agents 106A-106N, security monitoring system 108 and security level management unit 112 may also be implemented by respective processors. In examples described herein, each processor may include, for example, one processor or multiple processors included in a single device or distributed across multiple devices.

Examples in FIG. 1 may be described with respect to SDDC 104. However, examples described herein may be implemented in other management scenarios such as, but not limited to, a server fleet management. In the server fleet management, a central office may be considered as management node 110 to control and coordinate the functions of remote branch offices, where each remote branch office may correspond to one of groups of computing resources 102A-102N.

The examples described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Figures 2, 3:
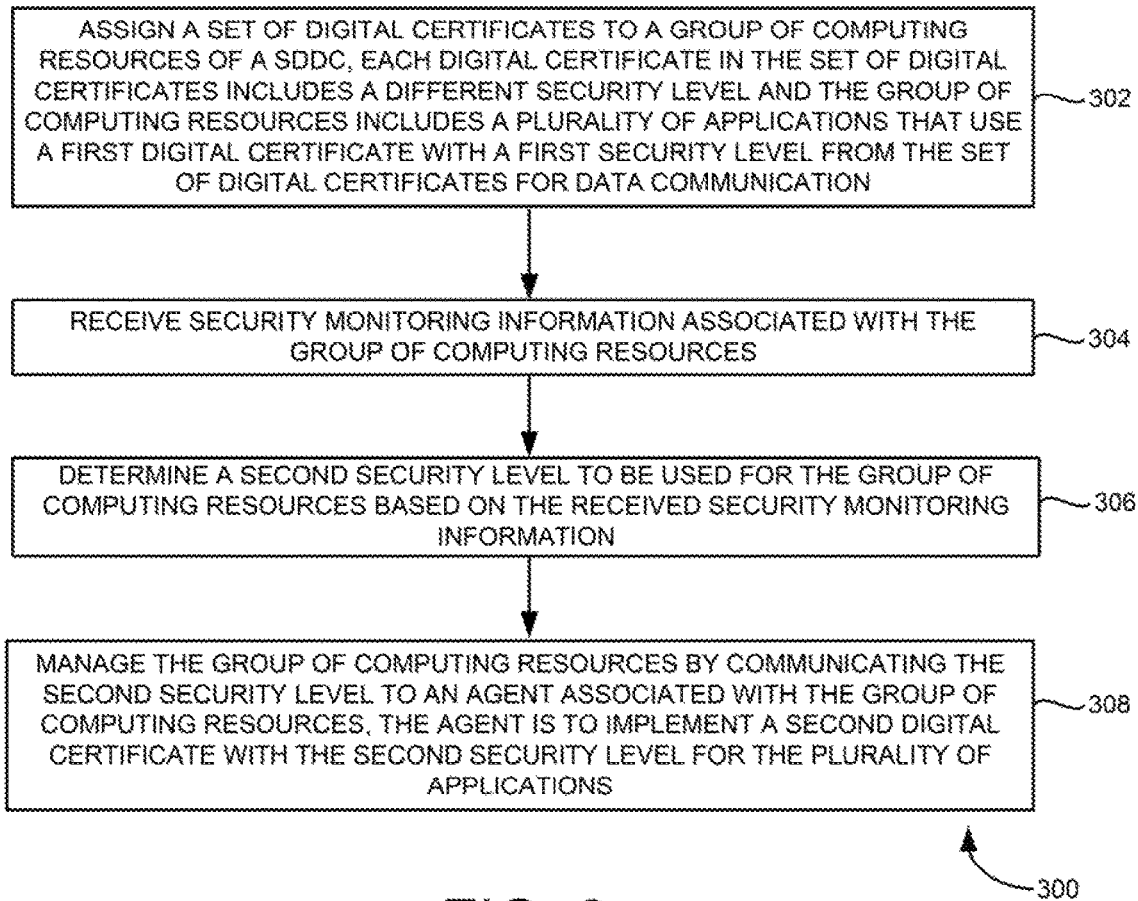
FIG. 2 is an example threat management table depicting mapping information associating threats and corresponding security levels of multiple groups of computing resources in the SDDC.
FIG. 3 is an example flow diagram of a method for determining a security level to be used for a group of computing resources in an SDDC.

FIG. 2 is an example threat management table 200 depicting mapping information associating threats and corresponding security levels of multiple groups of computing resources 202 in an SDDC. In one example, the mapping information may include a number of threats 204 and a severity of the threats 206 mapped with a corresponding security level 208. Further, threat management table 200 depicts a corresponding tag 210 assigned to each security level 208. For example, "Tag 1" may be assigned to a high security level, "Tag 2" may be assigned to a medium security level, and "Tag 3" may be assigned to a low security level.

In one example, a security level management unit (e.g., security level management unit 112 of FIG. 1) may dynamically create and maintain threat management table 200. During operation, when a security monitoring unit (e.g., security monitoring unit 108 of FIG. 1) notifies a threat detection to a management node (e.g., management node 110 of FIG. 1), the management node may execute the security level management unit to update threat management table 200. Further, based on threat management table 200, the security level management unit may dynamically determine a suitable security level of a digital certificate for the groups of computing resources (e.g., WL 1 to WL 4).

In one example, at an initial phase, threat management table 200 may be empty and the security level management unit may communicate agents in the groups of computing resources (WL 1 to WL 4) to use a digital certificate with a low security level. Further, the security level management unit may keep track of the digital certificate with security level currently using by each of groups of computing resources (e.g., WL 1 to WL 4) in threat management table 200. Further, based on the number of threats and/or severity of the threats corresponding to the groups of computing resources (WL 1 to WL 4), the security level management unit may dynamically notify the corresponding agents of the groups of computing resources (WL 1 to WL 4) to use a digital certificate with a higher security level. Also, in another example, when there are no attacks to the groups of computing resources (WL 1 to WL 4), the security level management unit may notify the corresponding agents to use a digital certificate with a reduced security level. Furthermore, threat management table 200 may be updated by the security level management unit accordingly.

In one example, security level 208 may not only depend on number of threats 204 occurred in the groups of computing resources (WL 1 to WL 4), but also depend on severity 206 of the threat. For example, each threat may have a different severity. As shown in example threat management table 200, WL 1 has 8 threats, however the threats may not significantly impact WL 1. In this example, severity 206 of WL 1 is considered as "low" and hence corresponding security level 208 is depicted as "low". Therefore, "tag 3" may be communicated to WL 1 so that an agent in WL 1 can implement a digital certificate with the low security level. Similarly, WL 4 has only one threat detected, however severity 206 of the threat is high. Hence, corresponding security level 208 is depicted as "high" for WL 4. In this example, "tag 1" may be communicated to WL 4 so that an agent in WL 4 can implement a digital certificate with the high security level. The logic for determining a security level of a digital certificate may be modified by a user depending on use case scenarios. For example, the user may modify the logic to consider the number of threats instead of the severity of the threats to determine the security level of the digital certificate.

Example Processes

FIG. 3 is an example flow diagram of a method for determining a security level to be used for a group of computing resources in a software defined data center (SDDC). It should be understood that the process depicted in FIG. 3 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 302, a set of digital certificates may be assigned to a group of computing resources of the SDDC. For example, the group of computing resources is to implement a workload domain. In one example, the workload domain may be deployed in a virtual server rack. The virtual server rack may include the group of computing resources located across a plurality of physical racks. In another example, the workload domain may be deployed in a single physical rack.

In one example, each digital certificate in the set of digital certificates may include a different security level. For example, the group of computing resources may maintain certificate templates that range from a minimum key length (e.g., significantly less secured) to maximum key length (e.g., significantly more secured) with supported digital certificates. In other words, the certificate templates may be bucketized as small, medium, and high security levels of the digital certificates. In one example, the group of computing resources may include applications that use a first digital certificate with a first security level from the set of digital certificates for data communication. For example, the application may initially use a low security level (i.e., the first security level) digital certificate.

At 304, security monitoring information associated with the group of computing resources may be received. At 306, a second security level to be used for the group of computing resources may be determined based on the received security monitoring information. In one example, the second digital certificate with the second security level may be determined from the set of digital certificates based on a number of threats and a severity of each of the threats in the security monitoring information.

In one example, the second digital certificate with the second security level from the set of digital certificates may be determined by updating mapping information in a threat management table using the received security monitoring information. For example, the mapping information may include the number of threats and the severity of the threats mapped with a corresponding security level. Further, the second digital certificate with the second security level may be determined using the updated mapping information.

At 308, the group of computing resources may be managed by communicating the second security level to an agent associated with the group of computing resources. In one example, the second security level is communicated to the agent associated with the group of computing resources via a tag associated with the second security level. Further, the agent may implement a second digital certificate with the second security level for the plurality of applications. In one example, the agent may select the second digital certificate, from the set of digital certificates, with the second security level corresponding to the received tag and implement the selected second digital certificate with the second security level for the applications in the group of physical resources for the data communication.

In one example, based on the applications (e.g., corresponding to entities or products such as NSX, vSphere, and the like of the applications) in the group of computing resources, the agent may implement the second digital certificate with the second security level. In this example, the second security level may be different from the first security level. For example, consider the agent has been communicated to use a medium security level digital certificate and one of the applications does not support the medium security level digital certificate. In this example, the agent may dynamically instruct to the applications to use a digital certificate with a next level of security (i.e., a high security level digital certificate). In some examples, any group of computing resources (e.g., a workload domain) can be excluded from dynamically adjusting the security level of digital certificates by setting a flag in the management node (e.g., management node 110 of FIG. 1). For the excluded workload domain, user can use a predefined static digital certificate, which cannot be dynamically changed based on the threats.

Figure 4:
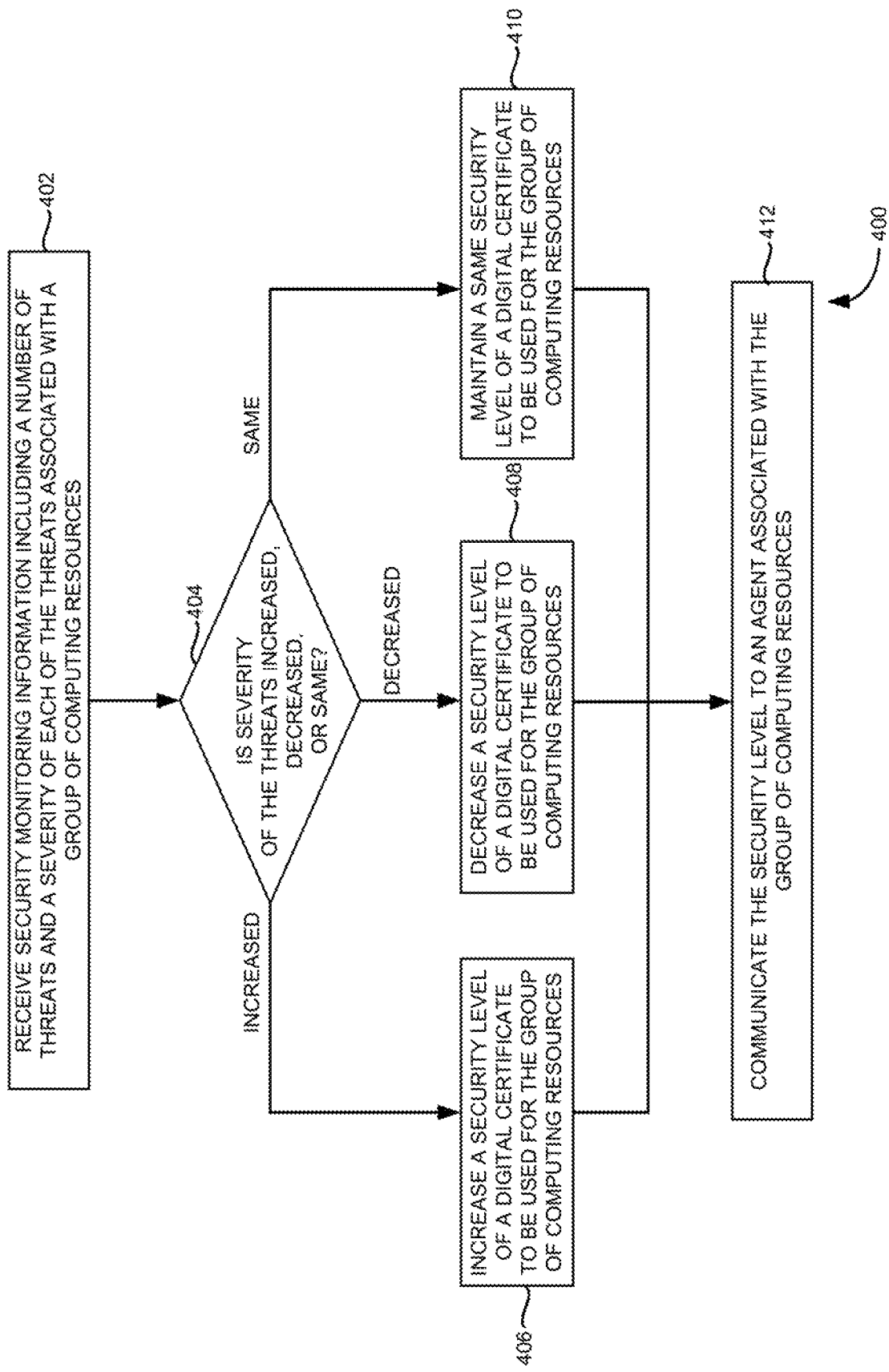
FIG. 4 is another example flow diagram of a method for determining a security level of a digital certificate to be used for a group of computing resources based on security monitoring information.

FIG. 4 is an example flow diagram 400 of a method for determining a security level of a digital certificate to be used for a group of computing resources based on security monitoring information. It should be understood that the process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, security monitoring information including a number of threats and a severity of each of the threats associated with the group of computing resources may be received. At 404, a check may be made to determine whether a severity is increased, decreased, or remains same based on the monitoring formation.

At 406, a security level of a digital certificate to be used for the group of computing resources may be increased when the severity is increased. At 408, the security level of the digital certificate to be used for the group of computing resources may be decreased when the severity is decreased. At 410, a same security level of the digital certificate to be used for the group of computing resources may be maintained when the severity remains same or unchanged. At 412, the corresponding security level may be communicated to an agent associated with the group of computing resources. Further, the agent may implement the corresponding digital certificate with determined security level for applications corresponding to the group of computing resources.

Figure 5:
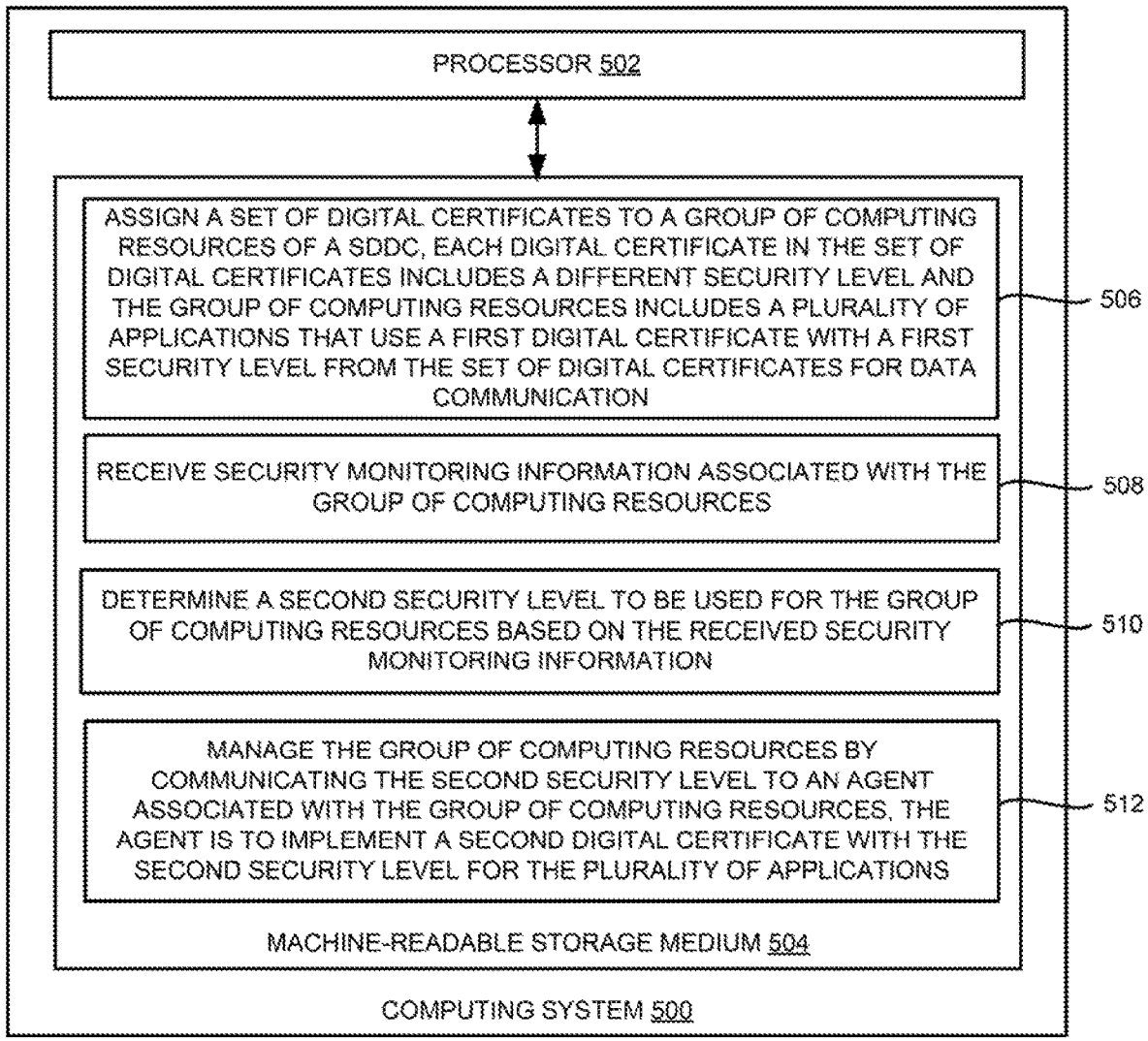
FIG. 5 is a block diagram of an example computing device including non-transitory computer-readable storage medium storing instructions to determine a security level to be used for a group of computing resources in an SDDC.

FIG. 5 is a block diagram of an example computing system 500 including non-transitory machine-readable storage medium 504, storing instructions to determine a security level to be used for a group of computing resources in a software define data center (SDDC). Computing system 500 may include a processor 502 and machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to computing system 500.

Machine-readable storage medium 504 may store instructions 506-512. In an example, instructions 506-512 may be executed by processor 502 to determine a security level to be used for the group of computing resources in the SDDC. Instructions 506 may be executed by processor 502 to assign a set of digital certificates to a group of computing resources of the SDDC. In one example, each digital certificate in the set of digital certificates may include a different security level and the group of computing resources may include a plurality of applications that use a first digital certificate with a first security level from the set of digital certificates for data communication.

Instructions 508 may be executed by processor 502 to receive security monitoring information associated with the group of computing resources. Instructions 510 may be executed by processor 502 to determine a second security level to be used for the group of computing resources based on the received security monitoring information. Further, instructions 512 may be executed by processor 502 to manage the group of computing resources by communicating the second security level to an agent associated with the group of computing resources. Further, the agent may implement a second digital certificate with the second security level for the plurality of applications.

Some or all of the system components and/or data structures may also be stored as contents (e.g., as executable or other machine-readable software instructions or structured data) on a non-transitory computer-readable medium (e.g., as a hard disk; a computer memory; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
    assigning a set of digital certificates to a group of computing resources of a software defined data center (SDDC), wherein each digital certificate in the set of digital certificates comprises a different security level, and wherein the group of computing resources comprises a plurality of applications that use a first digital certificate with a first security level from the set of digital certificates for data communication;
    receiving security monitoring information associated with the group of computing resources;
    determining a second security level to be used for the group of computing resources based on the received security monitoring information; and
    managing the group of computing resources by communicating the second security level to an agent associated with the group of computing resources, wherein the agent is to implement a second digital certificate with the second security level for the plurality of applications.

2. The method of claim 1, wherein the group of computing resources of the software defined data center is to implement a workload domain.

3. The method of claim 2, wherein the workload domain is deployed in a virtual server rack, and wherein the virtual server rack comprises the group of computing resources located across a plurality of physical racks.

4. The method of claim 2, wherein the workload domain is deployed in a single physical rack.

5. The method of claim 1, wherein determining the second security level comprises:
    determining the second digital certificate with the second security level from the set of digital certificates based on a number of threats and a severity of each of the threats in the security monitoring information.

6. The method of claim 5, wherein determining the second digital certificate with the second security level from the set of digital certificates based on the number of threats and the severity of each of the threats comprises:
    updating mapping information in a threat management table using the received security monitoring information, wherein the mapping information comprises the number of threats and the severity of the threats mapped with a corresponding security level; and
    determining the second digital certificate with the second security level using the updated mapping information.

7. The method of claim 1, wherein the second security level is communicated to the agent associated with the group of computing resources via a tag associated with the second security level, and wherein the agent is to implement the second digital certificate with the second security level for the applications in the group of physical resources based on the tag.

8. A system comprising:
    a group of computing resources of a software defined data center (SDDC), wherein the group of computing resources is a policy-based resource container that combines compute, storage, and networking into a single consumable entity, and wherein the group of computing resources execute a plurality of applications;
    an agent, running in the group of physical resources, implements a first digital certificate with a first security level for the plurality of applications, wherein the plurality of applications uses the first digital certificate with the first security level for data communication;
    a security monitoring unit communicatively coupled to the group of computing resources to monitor network traffic associated with the group of computing resources; and a management node communicatively coupled to the agent and the security monitoring unit, the management node executes a security level management unit to:
    receive security monitoring information from the security monitoring unit based on the monitoring of the network traffic;
    determine a second security level to be used for the group of computing resources based on the received security monitoring information; and
    manage the group of computing resources by communicating the second security level to the agent, wherein the agent is to implement a second digital certificate with the second security level for the plurality of applications.

9. The system of claim 8, wherein the group of computing resources is to implement a workload domain.

10. The system of claim 8, wherein the security monitoring unit is to:
    determine a number of threats and a severity of each of the threats while monitoring the network traffic associated with the group of computing resources; and
    communicate the security monitoring information including the number of threats and the severity of each of the threats to the management node.

11. The system of claim 10, wherein the security level management unit is to:
    update mapping information in a threat management table using the security monitoring information, wherein the mapping information comprises the number of threats and the severity of the threats mapped with a corresponding security level; and
    determine the second security level using the updated mapping information.

12. The system of claim 8, wherein the security level management unit is to:
    assign a set of digital certificates to the group of computing resources, wherein each digital certificate in the set of digital certificates comprises a different security level.

13. The system of claim 8, wherein the security level management unit is to:
    communicate the second security level to the agent via a tag associated with the second security level.

14. The system of claim 13, wherein the agent is to:
    implement the second digital certificate with the second security level for the applications in the group of physical resources based on the tag.

15. A non-transitory machine-readable storage medium encoded with instructions that, when executed by a processor of a computing system, cause the processor to:
    assign a set of digital certificates to a group of computing resources of a software defined data center (SDDC), wherein each digital certificate in the set of digital certificates comprises a different security level, and wherein the group of computing resources comprises a plurality of applications that use a first digital certificate with a first security level from the set of digital certificates for data communication;
    receive security monitoring information associated with the group of computing resources;
    determine a second security level to be used for the group of computing resources based on the received security monitoring information; and
    manage the group of computing resources by communicating the second security level to an agent associated with the group of computing resources, wherein the agent is to implement a second digital certificate with the second security level for the plurality of applications.

16. The non-transitory machine-readable storage medium of claim 15, wherein the group of computing resources of the SDDC is to implement a workload domain.

17. The non-transitory machine-readable storage medium of claim 16, wherein the workload domain is deployed in a virtual server rack, and wherein the virtual server rack comprises the group of computing resources located across a plurality of physical racks.

18. The non-transitory machine-readable storage medium of claim 16, wherein the workload domain is deployed in a single physical rack.

19. The non-transitory machine-readable storage medium of claim 15, wherein the instructions to determine the second security level comprises instructions to:
    determine the second digital certificate with the second security level from the set of digital certificates based on a number of threats and a severity of each of the threats in the security monitoring information.

20. The non-transitory machine-readable storage medium of claim 19, wherein the instructions to determine the second digital certificate with the second security level from the set of digital certificates based on the number of threats and the severity of each of the threats comprises instructions to:
    update mapping information in a threat management table using the received security monitoring information, wherein the mapping information comprises the number of threats and the severity of the threats mapped with a corresponding security level; and
    determine the second digital certificate with the second security level using the updated mapping information.

21. The non-transitory machine-readable storage medium of claim 15, wherein the second security level is communicated to the agent associated with the group of computing resources via a tag associated with the second security level, and wherein the agent is to implement the second digital certificate with the second security level for the applications in the group of physical resources based on the tag.

* * * * *